United States Patent
Renzi et al.

(10) Patent No.: US 9,568,644 B2
(45) Date of Patent: Feb. 14, 2017

US009568644B2

(54) POLYMERIZATION CATALYST FOR POLYTHIOURETHANES, POLYMERIZABLE LIQUID COMPOSITION AND PROCESS FOR THE PRODUCTION OF ORGANIC POLYTHIOURETHANE GLASS WITH A HIGH REFRACTIVE INDEX

(71) Applicant: MITSUI CHEMICALS, INC., Tokyo (JP)

(72) Inventors: Fiorenzo Renzi, Ravenna (IT); Roberto Forestieri, Ravenna (IT); Andrea Lukas Vecchione, Rimini (IT); Willem Bos, Arnhem (NL)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/329,470

(22) Filed: Jul. 11, 2014

(65) Prior Publication Data

US 2014/0323678 A1 Oct. 30, 2014

Related U.S. Application Data

(62) Division of application No. 13/699,176, filed as application No. PCT/IB2011/001087 on May 20, 2011, now abandoned.

(30) Foreign Application Priority Data

May 20, 2010 (IT) .............................. MI2010A0912

(51) Int. Cl.
| | | |
|---|---|---|
| *G02B 1/04* | (2006.01) | |
| *C08G 18/08* | (2006.01) | |
| *C08G 18/18* | (2006.01) | |
| *C08G 18/38* | (2006.01) | |
| *C08G 18/75* | (2006.01) | |
| *G11B 7/2533* | (2013.01) | |

(52) U.S. Cl.
CPC ............ *G02B 1/041* (2013.01); *C08G 18/089* (2013.01); *C08G 18/18* (2013.01); *C08G 18/3876* (2013.01); *C08G 18/758* (2013.01); *G02B 1/04* (2013.01); *G02B 1/043* (2013.01); *C08G 2125/00* (2013.01); *G11B 7/2533* (2013.01)

(58) Field of Classification Search
None
See application file for complete search history.

(56) References Cited

U.S. PATENT DOCUMENTS 4,521,545 A * 6/1985 Kerimis ............... C08G 18/168
521/107

4,689,376 A * 8/1987 Kerimis ............... C08G 59/688
525/504
5,962,561 A 10/1999 Turshani et al.
8,808,805 B2 8/2014 Groenewolt et al.
2009/0287015 A1 * 11/2009 Biteau ................... C07F 7/1836
560/147
2010/0234498 A1 9/2010 Iwazumi et al.
2011/0045190 A1 * 2/2011 Groenewolt ....... C08G 18/1883
427/385.5
2011/0065884 A1 3/2011 Kawato et al.
2011/0112269 A1 5/2011 Iwazumi et al.
2011/0190466 A1 8/2011 Hayashi et al.
2011/0251301 A1 10/2011 Bos et al.

FOREIGN PATENT DOCUMENTS

| CN | 101277989 A | 10/2008 |
|---|---|---|
| EP | 0 271 839 A2 | 6/1988 |
| EP | 0 912 632 B1 | 2/2005 |
| EP | 1 988 109 A1 | 11/2008 |
| EP | 1 988 110 A1 | 11/2008 |
| EP | 2 065 414 A1 | 6/2009 |
| JP | 60-55017 A | 3/1985 |
| JP | 10-121031 A | 5/1998 |
| JP | 2003-064146 A | 3/2003 |
| JP | 2004-182686 A | 7/2004 |
| JP | 2006-199885 A | 8/2006 |
| JP | 2008-074957 A | 4/2008 |
| JP | 2008-074958 A | 4/2008 |

(Continued)

OTHER PUBLICATIONS

International Search Report (PCT/ISA/210) issued on Oct. 10, 2011, by the European Patent Office as the International Searching Authority for International Application No. PCT/IB2011/001087.
F. Strain in: "Encyclopedia of Chemical Processing and Design", vol. II, p. 452-461, First Edition, Dekker Inc., New York.
"Encyclopedia of Polymer Science and Technology" (1964), vol. 1, p. 799-803, Interscience Publishers, New York.
Office Action issued in corresponding Chinese Patent Application 2011824922.0 dated Jan. 21, 2014.
English translation of JP 2008-074958.
Office Action issued in corresponding Japanese application on Aug. 19, 2014.

*Primary Examiner* — Jeffrey Washville
(74) *Attorney, Agent, or Firm* — Buchanan, Ingersoll & Rooney PC

(57) ABSTRACT

Polymerizable liquid compositions containing three components (A), (B) and (C) are provided, wherein component (A) contains at least one cycloaliphatic diisocyanate monomer wherein the weight percentage of free isocyanate groups in component (A) ranges from about 20% to about 50% by weight with respect to the total weight of component (A); component (B) contains at least one polythiol having a molecular weight ranging from 50 to 1,200 g/moles and a functionality ranging from 2 to 5, the components (A) and (B) being present in a weight ratio varying from 0.5:1 to 2:1; and component (C) being a defined polymerization catalyst. A process for the production of organic glass using the polymerizable liquid composition is further provided.

9 Claims, No Drawings

(56) References Cited

FOREIGN PATENT DOCUMENTS

| | | |
|---|---|---|
| JP | 2009-203398 A | 9/2009 |
| JP | 2011-509315 A | 3/2011 |
| WO | WO 2007/035215 A2 | 3/2007 |
| WO | WO2009/077180 * | 6/2009 |
| WO | WO 2009/077180 A1 | 6/2009 |
| WO | WO 2009/107946 A2 | 9/2009 |
| WO | WO 2010/001550 A1 | 1/2010 |
| WO | WO 2010/043392 A1 | 4/2010 |

* cited by examiner

POLYMERIZATION CATALYST FOR POLYTHIOURETHANES, POLYMERIZABLE LIQUID COMPOSITION AND PROCESS FOR THE PRODUCTION OF ORGANIC POLYTHIOURETHANE GLASS WITH A HIGH REFRACTIVE INDEX

The present invention relates to a polymerization catalyst for polythiourethanes, a polymerizable liquid composition containing it and a process for the production of organic polythiourethane glass with a high refractive index, good optical and physico-mechanical properties starting from said polymerizable liquid compositions; the invention also relates to organic glass obtained from the polymerization of said compositions by mould casting.

More specifically, the process for the production of organic glass of the polythiourethane type having a high refractive index and good optical and physico-mechanical properties, according to the present invention, applies to polymerizable liquid compositions essentially consisting of three components (A), (B) and (C):

the first component (A) contains at least one cycloaliphatic diisocyanate monomer; the second component (B) contains one or more polythiols having a molecular weight ranging from 100 to 1,000 g/moles, and a functionality ranging from 2 to 5; the third component (C) is a polymerization catalyst which does not contain organometallic compounds.

Thermosetting organic glass obtained from the polymerization of diethyleneglycol bis(allyl carbonate) known as Allyl Diglycol Carbonate (ADC), is of particular commercial interest for ophthalmic applications, in particular for the production of ophthalmic lenses. This organic glass is of particular interest due to its specific mechanical properties of aging resistance and processability, as described, for example by F. Strain, in: "Encyclopedia of Chemical Processing and Design", First Edition, Dekker Inc., New York, Vol. 11, page 452 onwards; and in "Encyclopedia of Polymer Science and Technology" (1964), Vol. 1, page 799 onwards, Interscience Publishers, New York.

The commercial success of ADC is due not only to the good properties of the polymerized products, but also to the relatively simple production technique of the manufactured products, known as "casting" or "manual casting".

By operating in accordance with this technique, the liquid compositions containing the polymerization initiator, are poured into a mould obtained by coupling two elements, generally glass elements, separated by a gasket made of a suitable material.

Due to a relatively low refractive index, however, the ophthalmic lenses obtained by polymerization of the ADC monomer have a considerable thickness.

Polythiourethanes are, in turn, well-known as resins having a high refractive index, cited, for example, in EP271839, one of the first papers which describes the reaction of isocyanates with sulfur containing compounds to give polythiourethanes. The main objective of EP271839 is to find a suitable internal mould release agent, as external mould release agents cause various surface defects. EP 271839 describes internal mould release agents selected from non-ionic fluorinated surfactants, non-ionic silicon surfactants, alkyl ammonium quaternary salts, metal salts of higher fatty acids and esters of phosphoric acid, in an amount of 10 to 10,000 ppm with respect to the total mixture. In a subsequent document, EP0912632, a narrower selection is described of the mould release agents of EP271832, showing that in practice many mould release agents do not function due to an inadequate detachment from the mould or as a result of incompatibility with the polymerizable composition. The mentioned patents, as also more recent publications such as WO2009107946, describe the use of mould release agents together with organometallic catalysts contain tin.

Organometallic catalysts containing tin are currently commonly used in industry, but as they represent a potential risk for both human beings and for the environment, due to their toxicity and bio-accumulation, various alternatives based on catalysts not containing tin, have recently been proposed.

WO2001001550 describes the use of a mixture of a zinc compound, a compound having general formula (1) and a compound having general formula (2)

EP19888109 describes a set of complexes of Al, Fe, Cu, Zn, Zr and Bi with dithiocarbamates, sulfonates, alkyl phosphates and substituted acetyl acetates.

EP19888110 discloses a mixture of an ester compound of a phosphoric acid together with a metal selected from the group of Zn, Cu, Fe, Ga, Bi, Al and Zr.

JP 2006199885 describes thiol complexes of Si, Ge, Sn, Zr or Ti.

Even if the tin has been substituted in these documents, it is doubtful whether this substitution has actually diminished the environmental risk, as the substituent elements are still very often heavy metals.

It is therefore preferable to substitute organometallic catalysts based on tin with non-metallic catalysts. EP2065414 discloses the use, as catalysts, of salts of chlorohydrate amine compared with triphenyl phosphine and 1,8-diazabicyclo-[5,4,0]-7-undecene. The last two cause opacity/turbidity of the resulting polymer, whereas this does not occur with the salts of chlorohydrate amine. The catalyst consisting of the salt of chlorohydrate amine is added in an amount which envisages an excess of catalyst ranging from 1.5 to 2 times the amount of internal mould release agent, i.e. the ester of phosphoric acid. The above combination enhances the uniformity of the polymerization reaction, reducing the effect of the fluctuation of acidity due to the mould release agent.

Non-metal catalysts are also described in JP20088074957 which provides for mixtures of amines and substituted sulphonates. These mixtures however do not operate as described in this document. In fact, the mixing of the various components does not lead to obtain polymerizable liquid compositions, but the premature formation of a viscous gel which proves to be unsuitable for the production of optical articles on an industrial scale. In JP2008074958, on the contrary, the amine compounds are combined with phosphates. More specifically, JP2008074958 discloses a system which provides a salt of a trifunctional amine and an alkyl ester of a phosphoric acid. The presence of a salt means that the amine and phosphoric acid are present in stoichiometric molar quantities. The substituents described for the trifunctional amines are hydroxyl, alkoxyl, phenyl or phenyl-substituted groups, whereas the group of trialkylamines is not claimed, probably in the light of the poor releasing properties from the mould shown in the comparative example 3 by these amines.

All of the above documents of the state of the art describe catalysts or combinations of catalysts-mould release agents which are claimed to allow low a opacity/turbidity to be obtained, together with good release from the mould and a good reactivity. None of these however faces a further relevant problem: obtaining a production process which is simple and easy.

An objective of the present invention is therefore to overcome the drawbacks of the compositions and processes according to the state of the art, producing new organic glass, with no optical defects, having all the favourable characteristics of some material having a high refractive index already on the market, in particular optimum optical properties, optimum processability and dyeability characteristic of the ADC polymer, but at the same time having an enhanced toughness and impact strength.

Furthermore, an objective of the present invention is also to find a process for the production of organic glass, i.e. end-products, starting from the new material, which is simple and inexpensive, which can be used on an industrial scale.

The present invention allows both objectives to be achieved. It relates, in fact, to a simple casting process for the production of transparent manufactured products having a high refractive index, made of plastic thermosetting material of the polythiourethane type with excellent physico-mechanical properties, starting from polymerizable liquid compositions which represent a further objective of the present invention.

The present invention has therefore surprisingly found a new catalytic system, not containing organometallic catalysts based on tin, which is simpler and which guarantees enhanced results in terms of simplicity and facility in effecting the productive process, a good release from the mould, a good reactivity, at the same time guaranteeing a product with a high refractive index, with good optical properties, an improved toughness and impact strength.

A first objective of the present invention therefore relates to a polymerization catalyst for polythiourethane organic glass, said catalyst not containing organometallic compounds and consisting of a mixture of:

a tertiary amine represented by the following general formula (1):

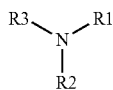

(1)

wherein:
R1, R2 and R3, equal to or different from each other, represent a $C_1$-$C_{20}$ linear or branched aliphatic group or a $C_3$-$C_{20}$ cycloaliphatic group, said groups possibly containing heteroatoms such as N, O, P, S, halogens;

a disubstituted phosphoric acid having general formula (2):

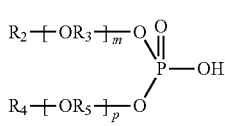

(2)

wherein R2 and R4, equal to or different from each other, represent a $C_1$-$C_{20}$ linear or branched aliphatic group or a $C_3$-$C_{20}$ cycloaliphatic group;
R3 and R5, the same or different, represent a $C_1$-$C_3$ alkylidene group and m and p are equal to 0, 1 or 2;
the tertiary aliphatic amine and disubstituted phosphoric acid being present in a molar ratio varying from 1/1.3 to 1/20 and, preferably, from 1/1.5 to 1/15.

A further object of the present invention therefore relates to polymerizable liquid compositions of the polythiourethane type, essentially consisting of three components (A), (B) and (C), wherein component (A) contains at least one cycloaliphatic diisocyanate monomer wherein the weight percentage of free isocyanate groups in said component (A) ranges from about 20% to about 50% by weight, preferably from about 25% to about 40% by weight, with respect to the total weight of component (A); component (B) contains at least one polythiol having a molecular weight ranging from 50 to 1,200 g/mole, preferably from 100 to 1,000 g/mole, and a functionality ranging from 2 to 5, preferably from 2 to 4, said components (A) and (B) being present in a weight ratio varying from 0.5:1 to 2:1, preferably from 1:1 to 2:1; component (C) being a catalyst according to the present invention.

Additives can be present in one of the two components (A) and (B), or in both, such as light stabilizers, antioxidants, UV absorbers, anti-fog agents, radical scavengers, dyes for colour correction, etc. The polymerizable composition according to the present invention does not require the separate addition of internal mould release agents such as non-ionic fluorinated surfactants, non-ionic silicon surfactants, alkylammonium quaternary salts or monoesters of phosphoric acid.

Furthermore, a further object of the present invention also relates to a process for the production of organic glass which envisages a casting and polymerization process of polymerizable liquid compositions of the polythiourethane type, comprising the following phases:

a mixing phase a) of components (A) and (C) wherein (A) is a cycloaliphatic diisocyanate monomer or a mixture of cycloaliphatic diisocyanate monomers and component (C) is a polymerization catalyst which does not contain organometallic compounds according to the present invention;

a mixing phase b) of the solution obtained by mixing phase a) and component (B) which contains at least one polythiol, possibly in the presence of other additives;

a filtration phase c) to remove any possible pollutants dispersed in the mixture, said filtration phase also being effected alternatively or additionally, on the single components (A) and (B) before the mixing phase b);

a filling phase d) of a mould, wherein the mixture obtained at the end of phase c) is placed inside the mould;

a polymerization phase e) wherein the liquid composition placed in the mould, is polymerized by thermal treatment.

The polymerization is generally carried out by gradually heating the moulds filled with the liquid composition, passing from low to high temperatures within a time span varying from a few hours to numerous tens of hours, as will be seen hereunder.

For the purpose of obtaining homogeneous optical articles and avoiding the presence of optical defects such as flow lines in the same optical articles, the presence of a catalyst is necessary, which ensures a good heat control as the temperature increases, but which, at the same time, has a high polymerization efficiency so as to allow the completion of the polymerization reaction and the production of a polymer characterized by optimal physico-mechanical properties, such as heat resistance and impact strength.

The catalyst must also have a low polymerization reactivity at low temperatures, so that the polymerizable composition is characterized by a sufficient pot-life until it is injected into the mould.

An object of the present invention also relates to the organic glass obtained by the casting and polymerization process of these compositions.

Finally, a further object of the present invention relates to the manufactured products or optical articles comprising the organic glass obtained by the casting and polymerization process of the polymerizable composition, such as, for example, ophthalmic lenses and optical filters, sheets, displays, sun glasses, etc.

The casting technique into a mould with which organic glass is obtained according to the present invention starting from polymerizable liquid compositions of the polythiourethane type, can be of the manual type, or it can avail of mixing-dispensing machines.

The two techniques for producing optical articles starting from polymerizable compositions according to the present invention, are briefly described.

Manual Casting

The manual casting process for the production of organic glass according to the present invention, comprises the following phases:

a) mixing the two components (A) and (C) in a suitable weight ratio. The mixing phase a) is normally carried out at a temperature close to room temperature, i.e., ranging from 20° C. to 30° C. in an inert atmosphere or under vacuum at an absolute pressure varying from 10 to 20 mbar for a period of about 1 hr; after the mixing phase a), the process comprises a mixing phase of the solution coming from the mixing phase a) and of component B) at a temperature ranging from 20 to 30° C. under vacuum at an absolute pressure ranging from 10 to 20 mbar for a period of 0.5-1 hr; filtration c) is then effected to remove any possible contaminants which could jeopardize the optical qualities of the end-product.

Filters of the propylene or nylon cartridge type, having a porosity of 0.5-1 absolute microns, are suitable for the purpose.

Alternatively or additionally, the filtration can be effected on the single components, separately, before the mixing phase.

During the mixing under vacuum, there is the complete degassing of the solution to guarantee the production of bubble-free polymerized optical articles.

Phase d) is then effected, in which the moulds are filled by gravity casting, or by means of mechanical pumps or by applying a gaseous pressure, followed by the subsequent polymerization phase e) of the liquid composition by thermal treatment of the mould with temperatures varying from 20 to 140° C., preferably from 30° C. to 130° C. and with polymerization times which normally vary from 1 hour to 40 hours, preferably from 3 to 30 hours.

The casting can be effected using moulds of various materials such as, for example glass or metals.

Traditionally, for ophthalmic lenses, use is made of glass moulds, metal moulds, however, offer various advantages such as, for example, a better dispersion capacity of the heat deriving from the polymerization reaction.

Suitable metallic moulds can be produced in stainless steel, nickel, aluminium, copper, chromium, silver and gold.

The manual casting technique applied in the process according to the present invention is completely similar to the casting technique used in the case of the ADC monomer but, with respect to this, the casting and polymerization process according to the present invention offers the advantage that the preparation of the polymerizable composition is effected at temperatures close to room temperature.

Casting with Mixing-Dispensing Machine

As already mentioned, as an alternative to manual casting, the casting of the polymerizable composition according to the present invention can also be carried out with the use of a mixing-dispensing machine.

A scheme of the apparatus is provided in Figure 1.

The machine essentially consists of:

two stirred tanks (first stirred tank and second stirred tank) for the two components (A)+(C) and (B) respectively. The two tanks are equipped for the degassing of the liquids under vacuum; the first stirred tank is filled with the necessary quantity of components (A) and (C) before use;

two membrane pumps which allow the separate passage of the two degassed liquids through suitable polypropylene filters;

two storage tanks (first storage tank and second storage tank) for the storage of the two filtered and degassed components;

two gear pumps with a variable ratio fed by gravity from the first storage tanks and the second storage tanks;

a Twinmixer gun;

a static-dynamic mixer which mixes the two liquids at the outlet of the gun and distributes the mixture thus obtained directly to the mould filling section.

With the exception of the two stirred tanks, all the other parts described above can be housed in a compact machine having limited dimensions, capable of mixing the two components (A)+(C) and (B) with a variable ratio as desired and at different temperatures, and dispensing the polymerizable mixture with a dispensing rate which is also variable, activating the conditions envisaged in the process phases according to the present invention.

The casting process with the above mixing-dispensing machine is composed of the following operations:

charging the mixture of components (A) and (C) into the respective stirred tanks. Additives such as UV stabilizers, dyes, etc., if not previously dissolved in the single components, can be added in this step into one of the two tanks or both;

degassing the liquids at about 20-30° C. for about 1 hour under vacuum and under stirring;

transferring the degassed liquids into the two storage tanks by means of membrane pumps, with passage through polypropylene filters having a porosity of 1 micron;

dosing the two components (A)+(C) and (B) according to the weight ratio selected, by means of the two gear pumps, from which they are sent separately to the Twinmixer gun and from this to the dynamic-static mixer, which dispenses the homogeneous polymerizable mixture thus obtained to the mould filling section.

The temperature in the transfer and dosage phases of the above components (A)+(C) and (B) and the dispensing rate are selected on the basis of the physico-chemical properties of the composition used, the type of optical article to be produced and its complexity.

The same considerations and conditions previously described for manual-type casting are valid for the casting and polymerization of the liquid composition.

The polymerizable liquid composition according to the present invention therefore allows articles characterized by a high refractive index, excellent optical and physico-mechanical properties to be produced on an industrial scale by means of a simple and inexpensive casting process.

With respect to the manual casting process, the stability over time of the polymerizable liquid composition, defined with the term "pot-life", which indicates the time range from the preparation of the mixture in which the viscosity remains sufficiently low to allow its use, becomes a critical parameter.

In the case of an insufficient pot-life, in fact, the polymerization reaction is extremely rapid, as soon as the three components (A), (B) and (C) are put in contact with each other, causing a rapid increase in the viscosity, which makes both the homogenization of the solution and also the subsequent mould filling phase extremely difficult. In this situation, it is only possible to fill a very limited number of moulds, therefore obtaining an insufficient number of defect-free optical lenses and making the process incompatible with industrial production requirements.

The pot-life, on the contrary, does not represent a critical parameter in the case of casting with a mixing-dispensing machine as the catalyzed solution is immediately injected into the mould.

The catalyst of the polymerizable liquid composition according to the present invention allows a high flexibility to be obtained in the catalysis of the polymerization reaction, thus allowing a variable pot-life, more or less long, to be envisaged in relation to the casting process selected, together with good mould release properties which make it suitable for an industrial product.

DETAILED DESCRIPTION OF THE PRESENT INVENTION

As already indicated, the present invention relates to a casting and polymerization process of polymerizable liquid compositions of the polythiourethane type for the production of organic glass with a high refractive index, having good optical and physico-mechanical properties.

The polymerizable liquid composition according to the present invention is composed of component (A), component (B) and component (C).

Component (A)

Component (A) of the polymerizable composition according to the present invention contains at least one cycloaliphatic diisocyanate monomer or a mixture of cycloaliphatic diisocyanate monomers, wherein the weight percentage of free isocyanate groups in said component (A) ranges from about 20% to about 50% by weight with respect to the total weight of component (A) and, preferably, ranges from about 25% to about 40% by weight with respect to the total weight of component (A).

Examples of cycloaliphatic diisocyanate monomers corresponding to component (A) of the composition according to the present invention are cyclohexane diisocyanate, methyl cyclohexane diisocyanate, bis(isocyanate methyl) cyclohexane, 4,4'-methylene bis(cyclohexyl isocyanate), 4,4'-isopropylidene bis(cyclohexyl isocyanate), 4,4'-dicyclohexylmethane diisocyanate), bis(isocyanate cyclohexyl) methane, bis(isocyanatecyclohexyl)-2,2-propane, bis(isocyanatecyclohexyl)-1,2-ethane, 3-isocyanate methyl-3,5,5-trimethyl cyclohexyl isocyanate commonly known as isophorone diisocyanate, 2,5(6)diisocyanate-methylbicyclo (2,2,1)heptane and octahydro-4,7-methane-1H-indendylmethyldiisocyanate.

The cycloaliphatic diisocyanate monomer of component (A) of the composition according to the present invention is preferably selected from 4,4'-methylene bis(cyclohexyl isocyanate) and bis(isocyanate methyl)cyclohexane.

Component (B)

Component (B) of the polymerizable composition according to the present invention contains one or more polythiols having a molecular weight ranging from 50 to 1,200 g/moles and preferably from 100 to 1,000 g/moles and a functionality from 2 to 5 and preferably from 2 to 4, said polythiols being selected from polythiols having general formula (3):

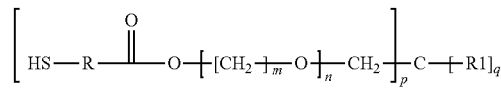

wherein:

R represents alkylidene groups having from 1 to 6 carbon atoms, the same or different; R1 represents alkyl groups having from 1 to 10 carbon atoms, the same or different; n ranges from 1 to 6; m varies from 1 to 6; p varies from 1 to 4; q is equal to 0 or 1 and p+q is equal to 4;

polythiols having general formula (4):

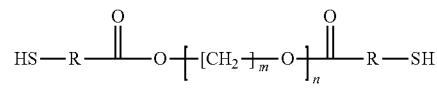

wherein:

R represents an alkylidene group having from 1 to 6 carbon atoms; n ranges from 1 to 6; m ranges from 1 to 6; and/or polythiols having general formula (5):

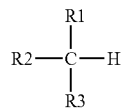

wherein:

R1=—(CH$_2$)$_n$—SH; R2=—S—(CH$_2$)$_n$—SH; R3=—R—S—(CH$_2$)$_n$—SH; R is an alkyl group having from 1 to 10 carbon atoms and n ranges from 1 to 3.

Examples of thiols having general formula (3), as component (B) of the polymerizable composition according to the present invention are: pentaerythritol tetrakis(3-mercaptopropionate), pentaerythritol tetrakis(thioglycolate), trimethylolpropane tris(thioglycolate), trimethylolpropane tris (3-mercaptopropionate).

Examples of thiols having general formula (4), as component (B) of the polymerizable composition according to the present invention are:

ethyleneglycol-di(3-mercaptopropionate), ethyleneglycol-di(2-mercaptoacetate), polyethyleneglycol-di(2-mercapto-acetate), polyethyleneglycol-di(3-mercaptopropionate), polypropyleneglycol-di(2-mercaptoacetate), polypropyleneglycol-di(3-mercaptopropionate).

Examples of thiols having general formula (5), as component (B) of the polymerizable composition according to the present invention are:
2,3-bis((2-mercaptoethyl)thio)-1-mercaptopropane,
5,7-dimercaptomethyl-1,1'-dimercapto-3,6,9-trithiaun-decane,
4,7-dimercaptomethyl-1,1'-dimercapto-3,6,9-trithiaun-decane,
4,8-dimercaptomethyl-1,1'-dimercapto-3,6,9-trithiaun-decane,
1,1,3,3-tetrakis(mercaptomethylthio)propane,
1,1,2,2-tetrakis(mercaptomethylthio)ethane.

Examples of preferred thiols are 2,3-bis((2-mercaptoethyl)thio)-1-propanethiol and a mixture of 2,3-bis((2-mercaptoethyl)thio)-1-propanethiol and ethylene glycol-di(3-mercaptopropionate)

Examples of components (A) and (B) preferably used are 4,4'-methylene bis(cyclohexyl isocyanate), as component (A), ethylene glycol-di(3-mercaptopropionate), and 2,3-bis(2-mercaptoethyl)thio)-1-propanethiol, as component (B).

The organic glass or optical articles according to the present invention are prepared by the polymerization reaction of components (A) and (B) according to suitable weight ratios which generally vary from 0.5:1 to 2:1, in the presence of a suitable catalyst which forms component (C) and possibly further additives such as those listed below.

Component (C)

Component (C) of the polymerizable liquid composition according to the present invention is a polymerization catalyst which does not contain organometallic compounds and consists of a mixture of
a tertiary amine represented by the following general formula (1):

wherein:
R1, R2 and R3, equal to or different from each other, represent a $C_1$-$C_{20}$ linear or branched aliphatic group, or a $C_3$-$C_{20}$ cycloaliphatic group, said groups possibly containing heteroatoms such as N, O, P, S, halogens;
a disubstituted phosphoric acid having general formula (2):

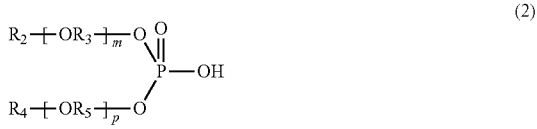

wherein:
R2 and R4, equal to or different from each other, represent a linear or branched $C_1$-$C_{20}$ aliphatic group, or a $C_3$-$C_{20}$ cycloaliphatic group;
R3 and R5, equal to or different from each other, represent a $C_1$-$C_3$ alkylidene group and m and p are equal to 0, 1 or 2;
the tertiary aliphatic amine and disubstituted phosphoric acid being present in a molar ratio varying from 1/1.3 to 1/20 and, preferably, from 1/1.5 to 1/15.

Amine compounds having formula (1) which can be used for the purposes of the present invention are tertiary aliphatic amines such as, for example: triethylamine, tri-n-propylamine, triisopropylamine, tri-n-butylamine, triisobutylamine, benzyldimethylamine, n-methyl-morpholine, dimethylcyclohexylamine, 1,2,2,6,6-pentamethyl-4-piperidinol, 1,2,2,6,6-pentamethyl-4-hydroxyethyl-4-piperidinol, dimethyldipropylenetriamine, pentamethyldiethylenetriamine, bis(2-dimethylaminoethyl)ether, N-methyl morpholine, triethylenediamine, bicyclo-octane diamine (DABCO), etc.

Sterically hindered amines such as amines known as HALS and in particular liquid tertiary amines, can also be used, such as, for example:
methyl-1,2,2,6,6-pentamethyl-4-piperidinyl sebacate;
mixtures of methyl-1,2,2,6,6-pentamethyl-4-piperidinyl sebacate and bis(1,2,2,6,6-pentamethyl-4-piperidinyl) sebacate;
bis(1,2,2,6,6-pentamethyl-4-piperidinyl)sebacate;
bis(2,2,6,6-tetramethyl-1-(octyloxy)-4-piperidinyl) sebacate.

Examples of preferred amines according to the present invention are triethylamine, tri-n-propylamine, tri-isopropylamine, and mixtures of methyl-1,2,2,6,6-pentamethyl-4 piperidinyl sebacate (preferably 25% by weight) and bis(1,2,2,6,6-pentamethyl-4 piperidinyl) sebacate (preferably 75% by weight).

Examples of disubstituted phosphoric acid having formula (2) which can be used for the purposes of the present invention are: dimethylphosphate, diethylphosphate, diisopropylphosphate, dibutylphosphate, dioctylphosphate, bis(2-ethylhexyl)phosphate, diisodecylphosphate, methoxyethyl-ethoxyethylphosphate, methoxyethyl-propoxyethylphosphate, ethoxyethyl-propoxyethyl phosphate, ethoxyethyl-butoxyethyl phosphate, di(methoxyethyl)phosphate, di(ethoxyethyl)phosphate, di(propoxyethyl)phosphate, di(butoxyethyl)phosphate, di(hexyloxyethyl)phosphate, di(decyloxyethyl) phosphate, di(methoxypropyl)phosphate, di(ethoxypropyl)phosphate, di(propoxypropyl)phosphate and/or mixtures of the same.

The disubstituted phosphoric acid used in the catalyst and therefore in the polymerizable liquid composition and process according to the present invention is preferably selected from $C_8$ diester of phosphoric acid, $C_{10}$ diester of phosphoric acid and/or mixtures thereof.

Examples of preferred catalysts are mixtures of triethylamine and bis(2-ethylhexyl)phosphate or mixtures of methyl-1,2,2,6,6-pentamethyl-4 piperidinyl sebacate (25% by weight) and bis(1,2,2,6,6-pentamethyl-4 piperidinyl)sebacate (75% by weight) with bis(2-ethylhexyl)phosphate.

According to the present invention, the quantity of component (C) ranges from 0.1 to 2% by weight with respect to the total weight of the polymerizable composition and preferably from 0.2% to 1.5% by weight with respect to the total weight of the composition.

Additives

Further additives can be incorporated into component (A) or component (B) or both, before the mixing phase or they can be added during the mixing phase of the two components.

Non-limiting examples of these additives are dyes, including photochromatic dyes, bluing agents, UV absorbers of the family of benzotriazoles, IR absorbers, antioxidants, anti-fog agents and radical scavengers.

A further improvement in the mechanical properties such as hardness, impact strength and abrasion resistance can be obtained by the addition of inorganic nanoparticles based on salts, or preferably based on zinc oxide, cerium oxide, silicon oxide, aluminium oxide, titanium oxide or zirconium oxide.

The polymerizable composition according to the present invention does not require the separate addition of internal mould release agents such as non-ionic fluorinated surfactants, non-ionic silicon surfactants, quaternary alkylammonium salts or monoesters of phosphoric acid, as it is in itself inherently provided with self-release properties.

With the polymerizable liquid composition according to the present invention, it is consequently possible to produce articles having a high refractive index with excellent optical and physico-mechanical properties, on an industrial scale, by means of simple and inexpensive casting techniques.

An object of the present invention also relates to the organic glass obtained with the casting and polymerization process of said compositions.

Finally, a further object of the present invention relates to end-products or optical articles comprising the organic glass obtained with the casting and polymerization process of the polymerizable composition according to the present invention, as previously described, such as, for example, ophthalmic lenses and solar filters, Fresnel lenses, protective and safety shields, displays, substrates for optical disks, display panels and video display units, optical guides, components for mobile phones, transparent tubes.

These end-products or optical articles can also be produced by processing with tool machines starting from semi-finished articles.

Said end-products or optical articles can be surface hardened with antiscratch coatings or they can be made non-reflective with techniques and materials normally used for ADC end-products.

As previously indicated, the extremely low viscosity values of the polymerizable compositions according to the present invention combined with a good pot-life of the composition itself, allow perfectly homogeneous mixtures of the various components to be obtained, consequently allowing defect-free optical end-products to be produced on an industrial scale.

This characteristic is essential in particular for the production process of organic glass by means of the manual casting technique, object of the present invention, as, thanks to this, it is possible to fill a considerable number of moulds in short times, thus satisfying the fundamental requisite for industrial-type production.

The polythiourethane thermosetting plastic materials, i.e. the organic glass obtained with the process according to the present invention, have excellent optical properties and an excellent processability, similar to those which characterize ADC polymers but, with respect to the latter, they are equipped with a much higher impact strength and toughness. These characteristics make the material suitable for the manufacturing of complex end-products which cannot be produced with ADC polymers.

As already observed, the quantity of catalyst and the molar ratio between the two components tertiary amine and disubstituted phosphoric acid, can be defined and optimized in the process according to the present invention so as to obtain a pot-life of the polymerizable composition which varies from short to sufficiently long and, at the same time, obtain a reduced polymerization time in the mould, which is economically advantageous, and makes the catalyst and therefore the process according to the present invention suitable for industrial production, as will appear evident from the following experimental examples.

In these examples, the pot-life at 25° C. of the polymerizable composition according to the present invention was evaluated by measuring the viscosity in consecutive times, starting from the preparation.

Starting from the assumption that the processing of the mixture (in particular the filtration and filling of the mould) becomes too difficult if the viscosity increases to over 300 cStokes, the pot-life is defined, within the scope of the present invention, as the time range necessary for reaching this viscosity value. Consequently according to the previous definition, an adequate pot-life at 25° C. is equal to at least 2 hours.

Flat sheets and ophthalmic lenses were prepared with the polymerizable liquid compositions of the following examples, using the casting technique in moulds assembled as previously described and using, depending on the specific cases, gaskets made of plasticized polyvinylchloride, low density polyethylene (LDPE), or another suitable material, compatibly with the processing conditions.

In particular, it has been surprisingly found that, thanks to the use, as polymerization catalysts, of a specific mixture of tertiary amines (preferably trialkylamines) and disubstituted phosphoric acid (preferably alkylphosphates) in a precise molar ratio which must not be stoichiometric, but ranging from 1/1.3 to 1/20, it is possible to obtain a better control of the pot-life with respect to the reactivity, also obtaining a high flexibility degree in the catalysis of the reaction and in the mould release properties.

The polymerizable liquid compositions were then subjected to polymerization by means of thermal treatment in a forced circulation oven, with a gradual temperature rise as indicated in the following experimental examples.

The physico-mechanical properties were determined on the polymerized products or organic glass thus obtained; in particular the following characteristics were determined:

(a) Optical Characteristics

Refraction index ($n^D_{20}$): measured with an Abbe refractometer (ASTM D-542);

Yellow index (YI), (ASTM D-1925), determined with a Macbeth Colour i5 spectrophotometer and defined as:

$$YI=100/Y \cdot (1.277X-1.06Z)$$

Light transmittance (ASTM D-1003), determined with a Macbeth Color i5 spectrophotometer, and expressed as a tristimulus value Y;

Haze % (ASTM D-1003), determined with a Macbeth Color i5 spectrophotometer.

(b) Physical and Mechanical Characteristics

Density: determined with hydrostatic scales at a temperature of 20° C. (ASTM D-792);

Rockwell hardness (M) measured with a Rockwell durometer (ASTM D-785);

Unnotched Izod impact strength (ASTM D-256 modified);

Deflection temperature under flexural load 1.82 MPa (HDT) (ASTM D-648).

(c) Chemical Resistance

The formation of defects in samples of flat plates was evaluated after immersion for 5 minutes in the following solvents: acetone, ethyl alcohol, $H_2SO_4$ (aqueous solution at 40%) and NaOH (aqueous solution at 10%).

The advantages deriving from the casting and polymerization process of the polymerizable compositions according to the present invention with respect to processes and compositions of the known art which in some cases are provided for comparative purposes, are evident from the following examples

Example 1

The composition nr. 1 was prepared according to the present invention, consisting of components (A), (B) and (C) in the quantities indicated in Table 1.

Component (A)

Component (A) consists of 4,4'-methylene bis(cyclohexyl isocyanate).

Component (B)

Component (B) is obtained by mixing at 25° C. and 10 mbar of pressure: ethyleneglycol-di(3-mercaptopropionate) and 2,3-bis((2-mercaptoethyl)thio)-1-propanthiol.

Component (C)

Component (C) is obtained by mixing at 25° C., triethylamine and bis(2-ethylhexyl)phosphate.

TABLE 1

| Composition n° | | 1 |
|---|---|---|
| Component (A) | H12MDI, g | 1500 |
| Component (B) | GDMP, g | 100 |
| (mixture) | DMPT, g | 900 |
| Component (C) | TEA, g | 0.82 |
| (mixture) | Bis(2-EHP),g | 8.18 |
| Molar ratio TEA/Bis(2-EHP) | | 1/3.1 |

Legend
H12MDI = 4,4'-methylene bis(cyclohexyl isocyanate)
GDMP = ethyleneglycol-di(3-mercaptopropionate)
DMPT = 2,3-bis((2-mercaptoethyl)thio)-1-propanthiol
TEA = triethylamine
Bis(2-EHP) = bis(2-ethylhexyl)phosphate Casting (Manual Casting)

1,500 g of component (A) and 9 g of component (C) previously prepared and consisting of 0.82 g of TEA and 8.18 g of Bis(2-EHP) (molar ratio TEA/Bis(2-EHP)=1/3.1), were charged into a two-necked jacketed flask, equipped with a thermometer and magnetic stirrer.

The whole solution was mixed at 25° C. for about 1 hour in an inert nitrogen atmosphere. 1,000 g of component (B) previously prepared, were added to the degassed and limpid solution thus obtained.

The whole solution was mixed at 25° C. for about 30 minutes, at an absolute pressure of 10 mbar, obtaining a polymerizable composition according to the present invention, on which the pot-life was evaluated with time at 25° C., by means of viscosity measurements at the same temperature (Table 2).

TABLE 2

| Composition n° | 1 |
|---|---|
| Initial Viscosity at 25° C. (cSt) | 34 |
| Viscosity after 1 hour at 25° C. (cSt) | 64 |
| Viscosity after 2 hours at 25° C. (cSt) | 111 |
| Viscosity after 3 hours at 25° C. (cSt) | 177 |
| Viscosity after 4 hours at 25° C. (cSt) | 276 |

The data indicate a pot-life higher than 4 hours and therefore suitable for the production of optical articles on an industrial scale with the manual casting technique.

The polymerizable composition thus obtained was poured into glass moulds and subjected to polymerization in a forced circulation oven with a gradual temperature increase from 40° C. to 130° C. in 24 hours.

At the end of the polymerization, upon opening the moulds, neutral lenses having a thickness of 2 mm and flat plates having a thickness of 3 mm were recovered, without any problems of pre-release or damage of the moulds, on which the characteristics indicated in Table 3 were determined.

For comparative purposes, the same table also indicates the properties of the ADC polymer obtained by polymerization as previously described.

TABLE 3

| Composition n° | | 1 | ADC |
|---|---|---|---|
| $n^D_{20}$ | | 1.592 | 1.500 |
| Abbe number | | 42 | 58 |
| Density, 20° C., g/ml | | 1.225 | 1.311 |
| YI[a] | | 0.50 | 0.80 |
| Light transmittance, Y | | 91 | 92 |
| Haze, % | | 0.1 | 0.1 |
| Rockwell hardness[a] | | 112 | 97 |
| Unnotched Izod impact strength, kJ/m² | | 108 | 25 |
| HDT, ° C. | | 102 | 58 |
| Chemical resistance (defects) | Acetone | No | No |
| | $C_2H_5OH$ | | |
| | $H_2SO_4$ | | |
| | NaOH | | |

The polythiourethane according to the present invention shows high refractive index values and a high Abbe number, excellent optical and physico-mechanical properties, the same or higher than those of the ADC polymer, in particular a density about 7% lower, an impact strength over 4 times higher and an HDT over 40° C. higher.

Example 2

Following the procedure of Example 1, the compositions from nr. 2 to 5 were prepared according to the present invention, consisting of Components (A), (B) and (C) in the quantities and under the conditions indicated in Table 4.

TABLE 4

| Composition n° | | 2 | 3 | 4 | 5 |
|---|---|---|---|---|---|
| Component (A) | H12MDI, g | 1530 | 1500 | 1500 | 1500 |
| Component (B) | GDMP, g | — | 50 | 100 | 100 |
| (mixture) | DMPT, g | 1000 | 950 | 900 | 900 |
| Component (C) | TEA, g | 0.9 | 0.75 | 1.0 | 0.68 |
| (mixture) | Bis(2-EHP)g | 3.75 | 3.75 | 8.0 | 6.8 |
| Molar ratio TEA/Bis(2-EHP) | | 1/1.3 | 1/1.5 | 1/2.5 | 1/3.1 |

The initial viscosity was measured on the degassed and limpid solutions thus obtained, and subsequently the viscosity, at the same temperature, in consecutive times, obtaining the values indicated in Table 5.

TABLE 5

| Composition n° | 2 | 3 | 4 | 5 |
|---|---|---|---|---|
| Initial Viscosity at 25° C. (cSt) | 52 | 53 | 40 | 40 |
| Viscosity after 1 hours at 25° C. (cSt) | 121 | 146 | 91 | 80 |
| Viscosity after 2 hours at 25° C. (cSt) | 250 | 274 | 182 | 128 |
| Viscosity after 3 hours at 25° C. (cSt) | 464 | 505 | 346 | 220 |

The data indicate in each case a pot-life higher than 2 hours and consequently suitable for the production of optical articles on an industrial scale with the manual casting technique.

From the data indicated in Table 5, it is also evident how the stability of the mixture according to the present invention can be varied, by modifying the concentration of the catalyst and molar ratio between the two components of the catalyst.

The polymerizable compositions from nr. 2 to nr. 4 thus obtained were poured into glass moulds and subjected to polymerization in a forced circulation oven with a gradual temperature increase from 40° C. to 130° C. in 24 hours.

At the end of the polymerization, upon opening the moulds, flat plates having a thickness of 3 mm were recovered, without any problems of pre-release or damage of the moulds, on which the characteristics indicated in Table 6 were determined, in which it can be seen that the transparent polythiourethanes according to the present invention have excellent optical and physico-mechanical properties, completely analogous to those obtained with the polymerizable compositions of Example 1 of the present invention.

TABLE 6

| Composition n° | | 2 | 3 | 4 | 5 |
|---|---|---|---|---|---|
| $n^D_{20}$ | | 1.595 | 1.594 | 1.591 | 1.592 |
| Abbe number | | 41 | 41 | 41 | 41 |
| Density, 20° C., g/ml | | 1.221 | 1.226 | 1.226 | 1.225 |
| Light transmittance, Y | | 91 | 91 | 91 | 91 |
| Haze, % | | 0.13 | 0.11 | 0.10 | 0.13 |
| Rockwell Hardness[a] | | 114 | 113 | 112 | 112 |
| Unnotched Izod impact strength, kJ/m² | | 85 | 94 | 106 | 105 |
| HDT, ° C. | | 119 | 105 | 103 | 100 |
| Chemical resistance (defects) | Acetone | No | No | No | No |
| | $C_2H_5OH$ | | | | |
| | $H_2SO_4$ | | | | |
| | NaOH | | | | |

Example 3

Composition nr. 6 was prepared according to the present invention, consisting of Components (A), (B) and (C) in the quantities indicated in Table 7.

Component (C) is obtained by mixing the following products at 25° C.:

methyl-1,2,2,6,6-pentamethyl-4-piperidinyl sebacate (25% by weight) and bis(1,2,2,6,6-pentamethyl-4 piperidinyl)sebacate (75% by weight);

bis(2-ethylhexyl)phosphate (Bis(2-EHP)).

TABLE 7

| | Composition n° | 6 |
|---|---|---|
| Component (A) | H12MDI, g | 1500 |
| Component (B) | GDMP, g | 100 |
| (mixture) | DMPT, g | 900 |
| Component (C) | Mixture of tertiary amines, g | 1.3 |
| (mixture) | Bis(2-EHP), g | 7.8 |
| Molar ratio (Tertiary amines)/Bis(2-EHP) | | 1/8.9 |

The initial viscosity was measured on the degassed and limpid solution thus obtained, and subsequently the viscosity, at the same temperature, in consecutive times, obtaining the values indicated in Table 8.

TABLE 8

| Composition n° | 6 |
|---|---|
| Initial Viscosity at 25° C. (cSt) | 47 |
| Viscosity after 1 hour at 25° C. (cSt) | 90 |
| Viscosity after 2 hours at 25° C. (cSt) | 145 |
| Viscosity after 3 hours at 25° C. (cSt) | 230 |

The data indicate a pot-life higher than 2 hours and consequently suitable for the production of optical articles on an industrial scale with the manual casting technique.

The polymerizable composition nr. 6 thus obtained was poured into glass moulds and subjected to polymerization in a forced circulation oven with a gradual temperature increase from 40° C. to 130° C. in 24 hours.

At the end of the polymerization, upon opening the moulds, flat plates having a thickness of 3 mm were recovered, without any problems of pre-release or damage of the moulds, on which the characteristics indicated in Table 9 were determined, in which it can be seen that the transparent polythiourethane according to the present invention has excellent optical and physico-mechanical properties, completely analogous to those obtained with the polymerizable compositions of Example 1 of the present invention.

TABLE 9

| Composition n° | | 6 |
|---|---|---|
| $n^D_{20}$ | | 1.591 |
| Abbe number | | 42 |
| Density, 20° C., g/ml | | 1.226 |
| Light transmittance, Y | | 91 |
| Haze, % | | 0.12 |
| Rockwell Hardness[a] | | 112 |
| Unnotched Izod impact strength, kJ/m² | | 104 |
| HDT, ° C. | | 104 |
| Chemical resistance (defects) | Acetone | No |
| | $C_2H_5OH$ | |
| | $H_2SO_4$ | |
| | NaOH | |

Comparative Example 1

The comparative compositions nr. 1C and nr. 2C consisting of Components (A), (B) and (C) in the quantities and under the conditions indicated in Table 10.

TABLE 10

| Comparative composition n° | | 1C | 2C |
|---|---|---|---|
| Component (A) | H12MDI, g | 1500 | 1500 |
| Component (B) | GDMP, g | 100 | 100 |
| (mixture) | DMPT, g | 900 | 900 |
| Component (C) | TEA, g | 0.9 | 0.9 |
| (mixture) | Bis(2-EHP), g | 2.9 | 3.2 |
| Molar ratio TEA/Bis(2-EHP) | | 1/1 | 1/1.1 |

The viscosity was measured on the degassed and limpid solutions thus obtained, at 25° C. one hour after the preparation, which proved to be higher than 500 cStokes and consequently these compositions are not suitable for the production of optical articles on an industrial scale with the manual casting technique as their pot-life is much lower than 2 hours.

The polymerizable composition nr. 1C thus obtained however was poured into glass moulds and subjected to polymerization in a forced circulation oven with a gradual temperature increase from 40° C. to 130° C. in 24 hours.

At the end of the polymerization it was not possible to open the moulds and recover the polymer sheet due to the excessive adhesion to the glass of the mould.

Comparative Example 2

The comparative compositions nr. 3 and nr. 4 of Table 11 were prepared operating according to what is described in patent application JP2008074957.

TABLE 11

| Component | Comparative composition n° | 3 | 4 |
|---|---|---|---|
| Diisocyanate | m-xylylenediisocyanate, g | 36.4 | — |
| | Mixture of 2,5-bis(isocyanate-methyl)-bicyclo-[2.2.1]-heptane and 2,6-bis(isocyanatemethyl)-bicyclo-[2.2.1]-heptane, g | — | 39.9 |
| Polithiol + amine | Mixture of 4-mercaptomethyl-1,8-dimercapto-3,6-dithiaoctane + triethylamine (1040 ppm), g | 33.6 | — |
| | Mixture of 4-mercaptomethyl-1,8-dimercapto-3,6-dithiaoctane + triethylamine (1100 ppm), g | — | 33.6 |
| Sulfonic Acid | Methanesulfonic acid, g | 0.07 | 0.074 |

Contrary to what is claimed in the above document, upon the addition of triethylamine, the immediate formation of a viscous gel was observed in both solutions, and consequently they are not suitable for the production of optical articles on an industrial scale.

The same result was observed by inverting the order of the addition of the amine and sulfonic acid.

The invention claimed is:

1. A polymerizable liquid composition of polythiourethane, comprising three components (A), (B), and (C),
   wherein component (A) is selected from 4,4'-methylene bis(cyclohexyl isocyanate) and bis(isocyanate methyl) cyclohexane;
   component (B) is selected from 2,3-bis((2-mercaptoethyl)thio)-1-propanethiol and a mixture of 2,3-bis((2-mercaptoethyl)thio)-1-propanethiol and ethylene glycol-di (3-mercaptopropionate),
   wherein said components (A) and (B) are present in a weight ratio varying from 0.5:1 to 2:1;
   component (C) being a catalyst for organic polythiourethane glass, wherein the catalyst does not contain organometallic compounds and consists of a mixture of a tertiary amine and a disubstituted phosphoric acid, wherein the component (C) is selected from a mixture of triethylamine and bis(2-ethylhexyl)phosphate and a mixture of methyl-1,2,2,6,6-pentamethyl-4 piperidinyl sebacate and bis(1,2,2,6,6-pentamethyl-4 piperidinyl) sebacate with bis(2-ethylhexyl)phosphate,
   wherein the tertiary amine and the disubstituted phosphoric acid are present in a molar ratio ranging from 1/1.3 to 1/20.

2. The polymerizable composition according to claim 1, wherein component (A) is 4,4'-methylene bis(cyclohexyl isocyanate) and component (B) is a mixture of 2,3-bis((2-mercaptoethyl)thio)-1-propanethiol and ethylene glycol-di (3-mercaptopropionate).

3. The polymerizable composition according to claim 1, wherein the quantity of component (C) ranges from 0.1 to 2% by weight with respect to the total weight of the polymerizable composition.

4. The polymerizable composition according to claim 3, wherein the quantity of component (C) ranges from 0.2 to 1.5% by weight with respect to the total weight of the polymerizable composition.

5. The polymerizable composition according to claim 1, wherein the catalyst consists of mixtures of triethylamine and bis(2-ethylhexyl)phosphate.

6. A process for the production of organic glass which provides a casting and polymerization process of the polymerizable liquid composition of polyurethane, according to claim 1, comprising the following phases:
   a mixing phase a) of components (A) and (C);
   a mixing phase b) of the solution obtained in the mixing phase a) and component (B), optionally in the presence of other additives;
   a filtration phase c) to remove any pollutants dispersed in the mixture, said filtration phase also being effected alternatively or additionally, on the single components (A) and (B) before the mixing phase b);
   a filling phase d) of a mould, wherein the mixture obtained at the end of phase c) is placed inside the mould; and
   a polymerization phase e) wherein the liquid composition placed in the mould, is polymerized by thermal treatment.

7. Organic glass obtained by the process according to claim 6.

8. Manufactured products or optical articles obtained by the processing of the organic glass according to claim 7.

9. Manufactured products or optical articles according to claim 8, selected from the group consisting of ophthalmic lenses, solar filters, Fresnel lenses, protective and safety shields, displays, substrates for optical disks, display panels and video display units, optical guides, components for mobile phones, transparent tubes.

* * * * *